Aug. 20, 1929.   A. H. HAWKINSON ET AL   1,725,515
METHOD OF SHARPENING HOLLOW OR MORTISER CHISELS
Filed March 19, 1925
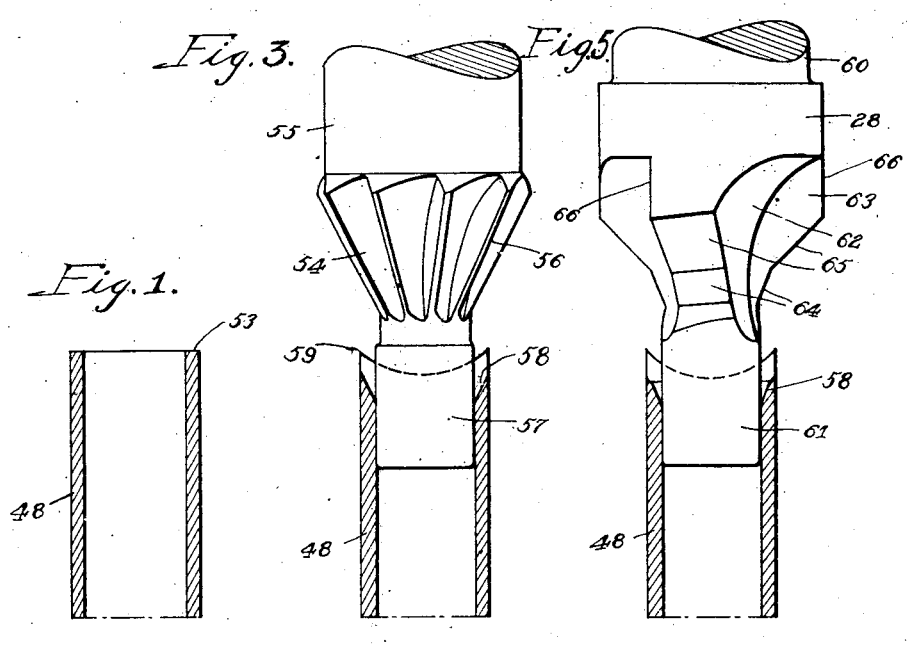
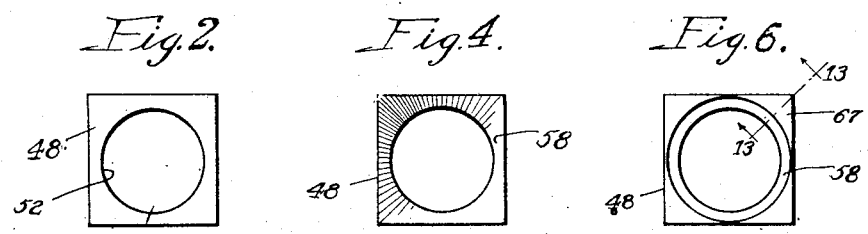

Patented Aug. 20, 1929.

1,725,515

UNITED STATES PATENT OFFICE.

ADOLPH H. HAWKINSON AND ERICK W. PETERSON, OF ROCKFORD, ILLINOIS, ASSIGNORS TO GREENLEE BROS. & CO., OF ROCKFORD, ILLINOIS, A CORPORATION OF ILLINOIS.

METHOD OF SHARPENING HOLLOW OR MORTISER CHISELS.

Application filed March 19, 1925. Serial No. 16,675.

Our invention relates to a novel method for sharpening hollow or mortiser chisels to provide the proper strength or body near the cutting edge proper to prevent the same from quickly dulling or burning out and also to give greater clearance between the drill bit and the chisel so that the chips and shavings between the bit and the chisel, as cut by the two, may be carried off and discharged from the chisel quickly and without undue friction.

It has been the custom to sharpen hollow chisels such as are used for mortising purposes, and particularly chisels of polygonal or square cross-sectional shape, by hand. This has been done by producing a beveled cutting edge of a single angle with a smooth or continuous face in a single plane extending at an acute angle with respect to the longitudinal axis of the chisel and bit, with the result that the body or thickness of the walls of the chisel adjacent the cutting edge was made very thin and the edge therefore became dulled very quickly in use. This was due to insufficient clearance between the bit and the beveled cutting edge of the chisel, and insufficient strength in the walls of the chisel just behind the cutting edge to resist the pressure and working stresses, with the result that the bit as well as the chisel would soon be dulled and even burned out owing to the clogging of the chips between the bit and the chisel. Furthermore, when the chisel was sharpened at one angle, there was the danger that if the walls of the chisel adjacent the cutting edges were cut too thin, the points of the chisel would project beyond the bit so that the latter could not serve its proper function, namely, to drill a hole of circular cross-section around which the material is cut by the chisel to produce a hole of rectangular or other polygonal cross-section, with the result that unnecessary stresses would be imposed upon the chisel and the escape of the chips or shavings cut by the bit and chisel, would be obstructed. Moreover, the sharpening of a hollow chisel required an expert and many chisels have been ruined by inexperienced workmen attempting to sharpen them.

The present invention provides a novel method of sharpening hollow or mortising chisels which permits the same to be sharpened in about one minute as compared with the average requirement of about thirty minutes per chisel in accordance with the old method. This invention also permits the sharpening operation to be performed on a machine which can be operated by an inexperienced workman, thus obviating the necessity of employing skilled labor for initially sharpening the chisels or keeping old chisels in perfect condition, and enabling the production of a cutting edge allowing for greater body or thickness in the walls of the chisel just behind the cutting edge where the greatest stresses occur in service, and preventing the walls from cracking. Our method also avoids the danger of the chisel quickly dulling or burning out, because it provides for sufficient clearance between the bit and the walls of the chisel to permit the easy escape of the chips cut by the bit and chisel.

It is also an object of the invention to provide, in practicing our method, a novel milling cutter or reamer adapted to be operated in a machine to ream the chisel to produce the cutting edge thereon thus eliminating hand operations.

Other objects and attendant advantages will be appreciated by those skilled in this art as the invention becomes better understood by reference to the following description when considered in connection with the accompanying drawing, in which:

Fig. 1 is a fragmentary sectional view of a portion of hollow stock material employed in the production of the chisels;

Fig. 2 is a plan view of Fig. 1;

Fig. 3 is a sectional elevation showing the initial step of reaming the chisel to the desired chip clearance angle;

Fig. 4 is a plan view of the chisel appearing in Fig. 3;

Fig. 5 is a sectional elevation showing the second reaming operation wherein the cutting edge of the chisel is produced;

Fig. 6 is a plan view of the chisel shown in Fig. 5;

Fig. 7 is a plan view of a completed chisel;

Fig. 8 is a partial section showing the novel chisel with a bit engaged therein for use, and Fig. 9 is an enlarged sectional view of a wall of the chisel at the cutting end thereof, taken on line 9—9 of Fig. 6.

Referring to the drawing, in the practice of our invention a piece of stock, rectangular or square in cross-section, is employed for producing a hollow or mortiser chisel. The reference numeral 48 is applied to the stock piece to constitute the body of the chisel and it will be observed that the same has a circular bore 52 drilled therethrough and that it also has a squared off end 53. The piece is suitably clamped between jaws properly centered with respect to the tool arranged to operate in the end of the bore thereof. The first operation requires the use of a taper reamer or milling cutter 54 arranged to be held by its shank 55 in the socket or chuck of preferably a hand-power machine. The reamer has its inclined cutting edges 56 centered with respect to the bore 52 by the entry in the bore of a pilot end portion 57 provided on the reamer. The reamer is arranged to be fed and turned, preferably by hand, to ream out the end of the chisel at a chip clearance angle, as indicated at 58. This leaves projecting corners 59 which are pointed and joined by arcuate edges as shown.

After this initial cut, the reamer 54 is withdrawn and the reamer 28 shown in Fig. 5 is substituted, the latter being arranged to be operated in the same machine. The reamer 28 consists of a shank 60 and a pilot or axial extension 61, with an intermediate enlarged body portion provided upon its periphery with a plurality of milled out depressions or recesses 62 running longitudinally and providing shoulders 63 extending radially and in line longitudinally with the axis of the body, shank, and pilot. The shoulders 63 are machined peripherally to provide reaming edges, the lower and smaller portions 64 of which extend substantially at the same angle as the chip clearance angle of the reamer 54 and the upper and larger portions 65 of which extend at an obtuse angle with respect to the portions 64. The faces 63 are ground as by means of a small emery wheel to grind the milled out portions 62 to provide sharp cutting edges along the angular portions 64 and 65 as clearly shown in Fig. 5 of the drawing.

By using the reamer 28 in the same manner as the reamer 54, with the pilot 61 engaged in the bore of the chisel 48 and turning the reamer in working engagement with the cutting edge of the chisel after having been cut by the reamer 54 as shown in Fig. 3 of the drawing, the cutting edges 64 will maintain the angular cut 58 but are preferably made to slightly under-cut the same, and the cutting edges 65 will ream out the end of the chisel to a cutting edge angle, as indicated at 67, the surfaces thus formed at 58 and 67 extending at obtuse angles with respect to one another. The surface 58 which is a chip clearance surface, terminates at 68, and the surface 67 which is the shank of the cutting edge, terminates in the edge 69. This form of cutting end, it will be observed by reference to point 70, affords an ample section, as shown by the line $x—x$, to resist the stress and strain incident to the operation of the chisel with a bit to avoid the danger of cracking of the chisel wall in service.

The final step in the sharpening operation consists in grooving or fluting the corners of the chisel at the inside, as indicated at 71 in Figs. 7 and 8 of the drawing. This may be done by grooving the inner wall with a square file or broach, the groove extending from the tip of the corner inwardly for preferably the length of the chisel wall. This provides extra chip clearance and permits the chips or shavings to be efficiently and quickly carried off between the drill bit designated at 72 and the inner wall of the chisel.

From the foregoing description it should be evident that a chisel produced in accordance with our invention by reason of the novel form of the cutting end thereof, provides for sufficient clearance between the bit and the walls of the chisel for the easy escape of the chips and shavings so that a mortise can be made with much less manual effort and without nearly as much danger of dulling the cutting edge of the chisel. Furthermore, the reaming of the cutting end first at one acute angle to the axis of the chisel, namely, the chip clearance angle, and then at a greater acute angle to the axis of the chisel, namely, the cutting edge angle, means the leaving of sufficient stock in the walls of the chisel just behind the cutting edge to resist the stresses and strains incident to the operation of the chisel with the bit so that there is little or no danger of the chisel cracking. In passing, attention may also be called to the fact that the chip clearance surface 58 also acts as a guide for the bit 72 to keep it centered with the chisel, it being, however, understood that the surface referred to is not intended to take any end thrust, both the bit and the chisel being held by their respective chucks during the joint operation.

The above description covers the sharpening of chisels which have not been previously sharpened or if the chisels should be split or the corners broken, they are filed or ground square as shown in Figs. 1 and 2 and then operated upon successively by the reamers 54 and 28, respectively, and then fluted at the corners as described in connection with Figs. 7 and 8 of the drawing. With new chisels or chisels which have been sharpened as shown in Figs. 3 and 4, in accordance with the old single angled method, the cutter 54 is first used to make the principal or heavy cut, in order to produce the chisel 58, the chisel being held properly centered in connection with the pilot 57. After this the reamer 28 is employed to produce the finished tool. If the chisel has been previously sharpened in accordance with the present invention. It is only necessary to resharpen the same by means of the reamer 28. It may also be pointed out that the reamers should not be revolved in the chisel without making a fairly heavy cut as light cutting has a tendency to round or dull the edge.

Sharpening in accordance with our invention eliminates guess-work and permits chisels to be quickly and efficiently sharpened by inexperienced workmen in considerably less time than heretofore required and at considerably less expense. It will also be understood that while we have described what we now consider to be the preferred embodiment of our invention, changes may be made therein without departing from the spirit and scope of the invention, so long as the same are covered by the claims.

We claim:

1. The method of sharpening hollow or mortiser chisels consisting of reaming the chisel to provide an annular portion in acute angled relation to its normal wall surface, then reaming the outer edge of said annular portion in acute angled relation with respect thereto while maintaining the inner portion at substantially the same angle as first cut, and finally fluting the corners of the chisel at the inside by grooving the same longitudinally of the chisel.

2. The novel method of sharpening mortiser chisels of square cross-section having a circular bore, consisting in beveling one end internally to provide an annular portion with projecting corners and intermediate arcuate edges between the corners, then beveling said annular portion at a second outward angle in obtuse angled relation to the first portion to provide a bit guide and a maximum thickness at the apex of the angle through the walls of the chisel, and finally grooving the corners of the chisel at the inside from the tips thereof.

3. The method of sharpening mortiser chisels of rectangular cross section having a circular bore consisting in beveling one end internally to provide an annular portion with projecting corners and intermediate arcuate edges between the corners, then beveling said annular portion at a second outward angle to provide a bit guide and a maximum thickness at the apex of the angle through the walls of the chisel, and finally cutting tapered flutes in the cutting edge portion diverging from the tips of the corners to the bore of the chisel.

4. The method of sharpening mortiser chisels of rectangular cross section having a circular bore consisting in beveling one end internally to provide an annular portion with projecting corners and intermedite arcuate edges between the corners, then beveling said annular portion at a second outward angle to provide a bit guide and a maximum thickness at the apex of the angle through the walls of the chisel, then cutting tapered flutes in the cutting edge portion diverging from the tips of the corners to the bore of the chisel, and finally cutting flutes longitudinally of the bore in register with the inner ends of the aforesaid tapered flutes.

5. The method of sharpening hollow chisels consistsing in reaming the cutting end thereof first to a predetermined angle relative to the axis to form an inner annular chip clearance surface and then to a larger angle to form another outer annular surface terminating in a cutting edge.

6. The method of sharpening hollow chisels, such as mortiser chisels, which are polygonal in cross-section, which consists in reaming the cutting end thereof at two different angles relative to the axis, a smaller angle to form an inner annular chip clearance surface and a larger angle to form an outer annular surface terminating in a circumferential cutting edge, and thereafter fluting the inside of the chisel longitudinally beginning at the cutting edge at the corners of the chisel.

7. The method of sharpening hollow chisels, such as mortiser chisels, which consists in reaming the cutting end to form an annular surface terminating in the cutting edge.

8. The method of sharpening hollow chisels, such as mortiser chisels, which consists in reaming the cutting end to form an annular surface terminating in the cutting edge, and thereafter fluting the inside of the chisel longitudinally beginning at the cutting edge at the corners of the chisel.

9. The method of sharpening hollow chisels of polygonal cross-section, such as mortiser chisels, which consists in reaming the cutting end thereof to form an annular surface terminating in a cutting edge extending from corner to corner of the chisel, thereafter fluting the inside of the chisel at the corners to a predetermined depth, and finally grooving the cutting end to join the tips of the corners with the flutes.

10. The method of sharpening hollow chisels of polygonal cross-section, such as mortiser chisels, consisting in reaming the cutting end thereof at two angles relative to the axis, at a smaller angle to form an inner annular chip clearance surface and at a larger angle to form an outer annular surface terminating in a cutting edge extending from corner to corner of the chisel, then fluting the inside of the chisel at the corners, and finally grooving the cutting end to join the corners with the flutes.

ADOLPH H. HAWKINSON.
ERICK W. PETERSON.